United States Patent
Söhngen et al.

[11] Patent Number: 5,924,029
[45] Date of Patent: Jul. 13, 1999

[54] MOBILE RADIO TRANSMISSION SYSTEM WITH INTEGRATED MEASURING DEVICE FOR MEASURING THE RADIO COVERAGE AREA

[75] Inventors: Burkhard Söhngen; Andreas Schröter, both of Nürnberg, Germany

[73] Assignee: U.S. Philips Corporation, New York, N.Y.

[21] Appl. No.: 08/737,178

[22] PCT Filed: Feb. 21, 1996

[86] PCT No.: PCT/IB96/00135

§ 371 Date: Nov. 6, 1996

§ 102(e) Date: Nov. 6, 1996

[87] PCT Pub. No.: WO96/27995

PCT Pub. Date: Sep. 12, 1996

Related U.S. Application Data

[30] Foreign Application Priority Data

Mar. 8, 1995 [DE] Germany ............................ 195 07 866

[51] Int. Cl.$^6$ ................................................. H04B 17/00
[52] U.S. Cl. ..................... 455/423; 455/67.4; 455/424; 455/561; 379/21
[58] Field of Search ................. 455/423, 67.1, 455/67.4, 422, 424, 425, 426, 560, 561; 379/21, 27, 164, 165, 156, 157

[56] References Cited

U.S. PATENT DOCUMENTS

| | | | |
|---|---|---|---|
| 4,520,235 | 5/1985 | Morikawa et al. | 379/164 |
| 4,536,615 | 8/1985 | Kimijima et al. | 379/159 |
| 4,932,043 | 6/1990 | Nakayama et al. | 379/157 |
| 4,977,399 | 12/1990 | Price et al. | 340/825.49 |
| 5,265,150 | 11/1993 | Helmkamp et al. | 455/555 |
| 5,333,182 | 7/1994 | Aoki | 370/294 |
| 5,428,821 | 6/1995 | Krisna et al. | 455/522 |
| 5,471,649 | 11/1995 | Rees et al. | 455/67.4 |
| 5,521,958 | 5/1996 | Selig et al. | 379/21 |
| 5,764,726 | 6/1998 | Selig et al. | 379/21 |

FOREIGN PATENT DOCUMENTS

0565150A1  10/1993  Germany .

*Primary Examiner*—Willis R. Wolfe
*Assistant Examiner*—Hieu T. Vo
*Attorney, Agent, or Firm*—Dicran Halajian

[57] ABSTRACT

A communication system is disclosed having a base station and a cordless mobile station for communicating with the base station. The base station includes a data interface for connection to a data line in a normal mode of operation. The base station has a detector and a transmitter. The detector detects whether the data interface is connected to the data line. In response to the detector detecting that the data interface is not connected to the data line, the transmitter transmits a test signal to the cordless mobile station for measuring the field strength of the test signal received thereby.

6 Claims, 2 Drawing Sheets

MOBILE RADIO TRANSMISSION SYSTEM WITH INTEGRATED MEASURING DEVICE FOR MEASURING THE RADIO COVERAGE AREA

FIELD OF THE INVENTION

The invention relates to a mobile radio communications system, more particularly, a communications system formed by cordless telephones for a private branch exchange, which system comprises at least a base station to be connected to a data interface, and at least a mobile station.

The invention further relates to a base station, a mobile station and a measuring case for such a mobile radio communications system.

BACKGROUND OF THE INVENTION

Such a mobile radio communications system is used, for example, in so-called in-house radio networks. A plurality of base stations instead of conventional telephone sets or in combination with them can then be connected to a private branch exchange. The base stations make the connection possible to a plurality of cordless telephones within the radio coverage area of the base stations. The coverage of such base stations is generally about 50 to 300 meters depending on the radio environment. For larger complexes of buildings and office or factory sites which are to be covered by such a mobile radio communications system, the problem occurs that, already in the planning phase of the mobile radio communications system, there has to be determined where and how many base stations are necessary for covering the complex of buildings or the office or factory site.

Such a mobile radio communications system is known from EP 0 565 150 A1.

SUMMARY OF THE INVENTION

It is the object of the invention to provide a mobile radio communications system of the type defined in the opening paragraph, which makes a measurement of the mobile radio communications system possible in a simple manner.

This object is achieved in a mobile radio communications system of the type defined in the opening paragraph, in that the base station includes detection means for detecting whether the data interface is connected to a data line and in that the base station includes transmitter means for transmitting a test signal to the mobile station when there is detected that the data interface is not connected to a data line.

The invention is based on the recognition that when such a mobile radio communications system is planned, the complex of buildings or the office or factory site to be covered by radio often does not yet comprise the necessary infrastructure for connecting the base station or the base stations to a switching center, because, for example, the building is only finished as a carcass building. Thus, in many cases, regular operation of a switching center with cordless telephones cannot possibly be tested. An effective measurement of the radio coverage area is then made possible in that the base station or base stations are only connected to an internal or external power supply. The base station then detects that there is no regular operation in a switching center and changes to a test mode in which it sends out a test signal. Via an accordingly arranged mobile station for receiving and detecting the test signal, the radio coverage area to be screened can now be detected and be optimized by purposefully locating further base stations until a complete radio coverage of the area is ensured. The basis for the planning or completion of such a mobile radio communications system may then be inexpensive standard components, in which the base station only needs to have the detection means and the mobile station needs to have the means for detecting the test signal transmitted by the base station. As a result, a reliable, simple and cost-effective dimensioning of the mobile radio communications system is made possible. The use of standard components furthermore enables the service engineer working on the spot, who is responsible both for covering existing mobile radio communications systems and planning new mobile radio communications systems, only needs to have one set of measuring equipment. As a rule, this is a measuring case which can be used both for testing communications systems which already exist and for measuring mobile radio communications systems which are to be planned. Such a measuring case can also be formed by inexpensive standard components which components can be completed, in essence, by the detection means of the base station.

A simple possibility for driving the data interface may be created in that the data interface of the base station is used for connection to a power supply arrangement. When tested, the base stations of the mobile radio communications system are thus not connected to a data interface, as is regularly found, for example, the so-called $S_o$ interface of an ISDN switching point, but the data interface of the base station is supplied with power via a plug-in network section which, acting as a phantom power supply, supplies a DC voltage. On the basis of this phantom power supply, the base station can detect that no "proper" data supply is available and then go over to the test mode.

A simple and effective "experience" of the radio coverage area of the base stations is then made possible in that the mobile stations comprise means for detecting the test signal and in that the test signal can be detected as an acoustic signal in the mobile radio station.

A more exact detection of the marginal areas of the radio coverage area is made possible in that the mobile stations comprise means which enable the test signal to vary in dependence on predefinable indicators, more specifically, field strength indicators.

These and other aspects of the invention will be apparent from and elucidated with reference to the embodiments described hereinafter.

DETAILED DESCRIPTION OF THE INVENTION

Figure 1:
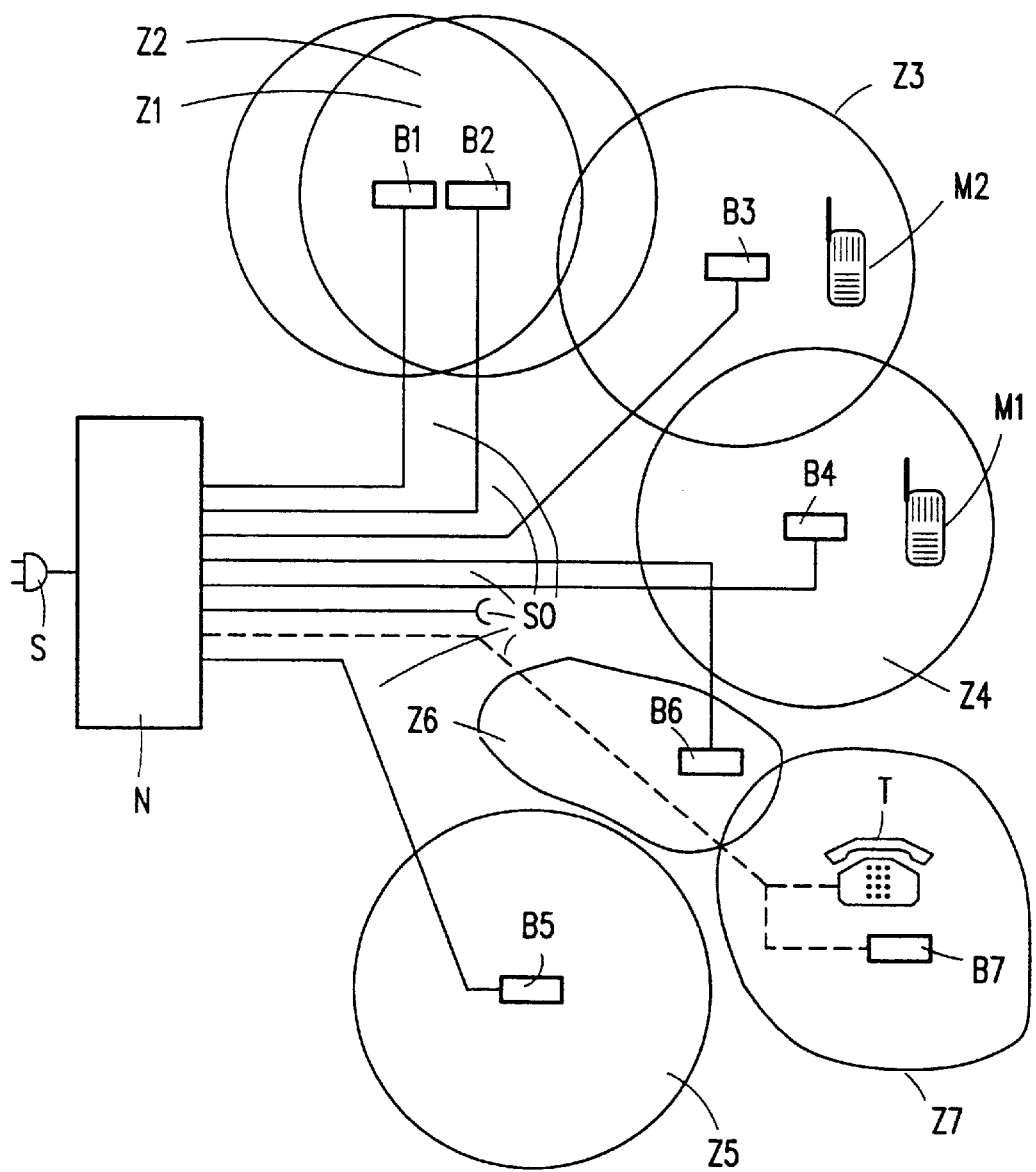
FIG. 1 shows a mobile radio communications system formed by cordless telephones.

FIG. 1 shows an illustrative embodiment of a mobile radio communications system to be planned. The mobile radio communications system provides the radio coverage of, for example, a complex of buildings, in which the mobile radio communications system covers in one radio coverage area in the same way as the complex can be covered by the sum of the individual radio coverage areas Z1 . . . Z7. The mobile radio communications system to be planned, as is represented in FIG. 1, comprises base stations B1 . . . B7 and mobile stations M1, M2. The base stations B1 . . . B7 cover the respective radio cells Z1 . . . Z7. The base stations B1 . . . B7 and the mobile stations M1, M2 can be connected to a switching center not shown in the drawing Figure. The base stations B1 . . . B7 are connected via a data interface $S_o$. In the illustrative embodiment shown in FIG. 1 the data interfaces $S_p$ are connected to a power supply arrangement N which is used for connecting to a supply voltage via a plug and socket connection S.

The radio coverage areas Z1 . . . Z5 of the base stations B1 . . . B5 are represented in simplified form as circles in the illustrative embodiment shown in FIG. 1. In reality, this generally does not correspond to the actual contours and outlines of the radio coverage areas in buildings. A realistic representation of the radio coverage areas is given in the illustrative embodiment shown in FIG. 1 by the radio coverage areas Z6, Z7 of the base stations B6 and B7. The illustrative embodiment shown in FIG. 1 does not show a mobile radio communications system in operation, but the selected representation is only to show that in a planning phase of a mobile radio communications system, which system is provided, for example, for covering a complex of buildings, there is achieved that a radio area is substantially covered by the radio coverage areas Z1 . . . Z7. Furthermore, there is assumed that the complex of buildings to be covered does not yet have the necessary line infrastructure for connecting the base stations to a switching center as is often the case in practice with carcass buildings. In the following, the procedure for measuring and dimensioning the mobile radio communications system will be clarified with reference to the illustrative embodiment shown in FIG. 1. With the aid of a measuring case which contains a base station B1, a mobile station M1 and a power supply arrangement N, the expert occupied with planning will, for example, first position the base station B1 in the radio coverage areas Z1, Z2 and then connect the base station B1 to the power supply arrangement N via the data interface $S_o$. Via the plug-in connector S, the power supply arrangement N can be supplied with power from an external voltage source. In the case where an external voltage source is unavailable, the power supply of the power supply arrangement N may be ensured either via a generator or a battery. This measuring device which is formed by the power supply arrangement N, base station B1 and mobile station M1 now operates as follows:

The base station includes detection means which detect that the data interface $S_o$ is not connected to a data line of a switching center, but is connected only to the power supply arrangement N which produces, for example, a DC voltage from a power supply. Subsequently, the base station B1 changes to a test mode which leads to a test signal being transmitted. While taking along the mobile station M1, the attending planning expert can go away from the base station B1 and experience the coverage of the cells of the radio coverage areas Z1, for example, by hearing the noise. A corresponding procedure is also carried out for locating the base stations B2 . . . B7, until optimum coverage of the radio coverage area is ensured.

In FIG. 1, the connecting line of the base station B7 of the radio coverage area Z7 is only shown in a dashed line, while, additionally, a conventional telephone set T is drawn within the range of the radio coverage area Z7. This is to clarify that the described procedure for measuring a radio coverage area can also be used when existing mobile radio communication systems are expanded or completed, if, for example, the necessary lines for connecting the base station B7 to the switching center are not yet available, or the optimum location of the base station 7 is still to be determined. Also in that case, a fast and reliable optimization of an existing mobile radio communications system is possible.

For example, a data interface of a base station may be connected to power via the plug-in connector needed anyway for operation of the base station. The described measuring method alleviates the need for expensive measuring devices. Further, this method allows measurement when the mobile station is actually used during normal operation, and the measurement results include the actual radiation pattern of the mobile station's antenna. This eliminates errors in measuring results using conventional measuring devices which use an antenna different from the antenna of the mobile station.

Figure 2:
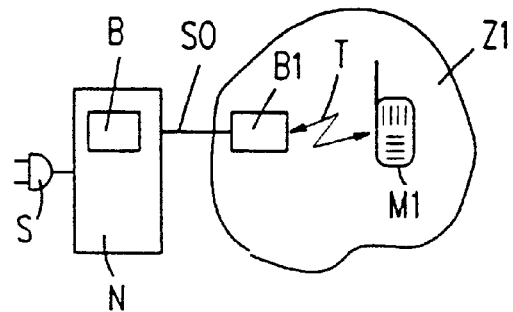
FIG. 2 shows an illustrative embodiment of a base station with an associated mobile station of such a mobile radio communications system.

FIG. 2 shows a further illustrative embodiment of a mobile radio communications system which may be used for measuring a cellular radio network. The mobile radio communications system for measuring a radio coverage area to be planned is formed by a base station B1 and an associated mobile station M1 which together form a cordless telephone system. The base station B1 may be connected to an external voltage source via a power supply arrangement, for example, a plug-in connector N and a plug S. In addition, the network connector N includes a battery B which also enables the base station B1 to be battery-operated.

The mode of operation of the combination shown in FIG. 2 has already been described with reference to FIG. 1. In the embodiment for a mobile radio communications system shown in FIG. 2, which system may be used for measuring a radio coverage area, is particularly advantageous in that the hardware of the base station need not be modified; the base station is supplied with power via a modified plug-in power supply N. The software of the base station is modified to the effect that the base station B1 includes detection means which changes to an installation, that is, test mode when it detects that the data interface $S_o$ is not connected to a data line of a switching center but only to a DC voltage. For example in the base station this is shown by a blinking signal or a light-emitting diode. Furthermore, the software of the base station B1 is modified in that a special system identifier is reserved which is used for the base station in this test mode to accept outgoing calls from a mobile station M1 which has this system identifier. This system identifier can be programmed in the mobile station M1 and, as a result, a continuous connection to the base station B1 can be established. For example, a permanent dialling tone can be activated as a test signal T in the base station B1, which dialling tone permits a subjective assessment of the transmission quality.

In addition to its use as a measuring device for a service engineer, the described mobile radio communications system, that is, a cordless telephone B1, M1, having such a structure, also enables a regular user to test the structure of the current radio coverage area of his base station B1 as an additional feature. By means of the described test mode, the regular user can exactly determine his radio coverage area(s) and optimize, as required, the location of the base station on the basis of the measuring results found.

Figure 3:
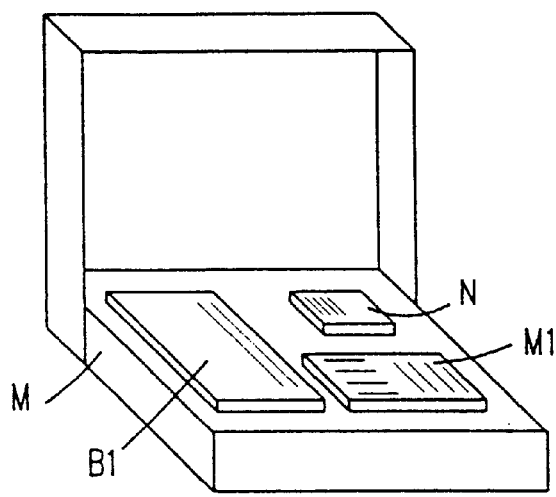
FIG. 3 shows an illustrative embodiment of a service case containing a base station, a mobile station and a power supply arrangement.

FIG. 3 shows an illustrative embodiment of a measuring case M. The measuring case or coverage case is provided for servicing a private branch exchange with cordless telephones and contains a base station B1, a mobile station M1 and a plug-in connector N. In essence, the measuring case M thus contains inexpensive standard components, with respect to hardware, the case equipment corresponds to service cases already known, only the base station comprises detection means for detecting whether the data interface of the base station is connected to a data line. As has already been described with reference to FIGS. 1 and 2, a measuring case having such equipment makes it possible to create a reliable, simple and cost-effective dimensioning of a switching center with cordless telephones. For the service engineer it is then possible to use only the measuring equipment in the form of the measuring case M both for planning new mobile radio communications systems and for servicing existing arrays.

Figure 4:
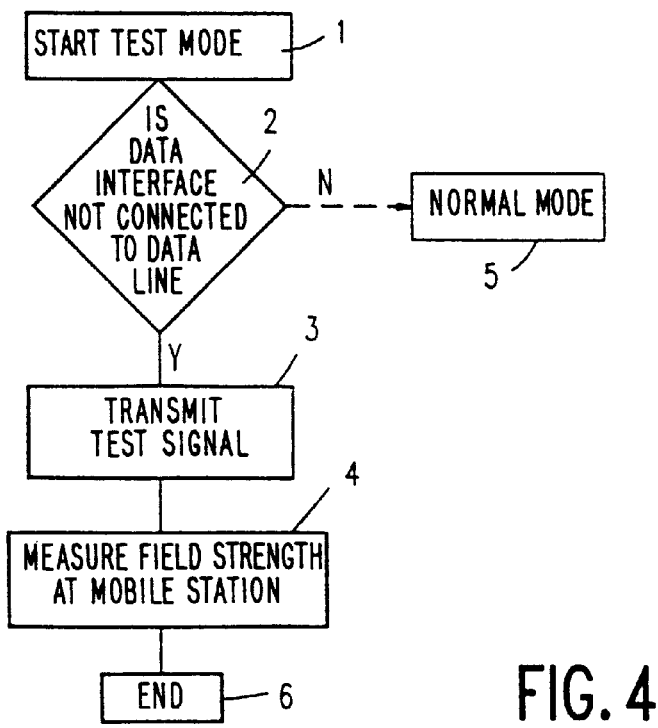
FIG. 4 shows a flow chart of a test mode for measuring the radio coverage area or the radio coverage areas of a mobile radio communications system.

FIG. 4 shows a flow chart of a test mode of a base station B1 as this mode has already been explained in connection with FIGS. 1 and 2. In block 1 the test mode in the base station B1 is first activated, which is introduced, for example, in that the detection means of the base station B1 detect that not a data line of a switching point, but, for example, a power supply arrangement is connected to the data interface of the base station. Such an examination takes place in block 2. In the case where there is no phantom power supply, the base station changes to normal operation (block 5). If a phantom power supply is detected, a call is set up between base station and mobile station in block 3 in that a test signal is sent out, which call set-up can be activated from the base station and/or from the mobile station. As a next step of the test mode in block 4, a field strength in the mobile station M1 is measured, which field strength measurement can either be detected from noise perceivable in the mobile station, or a measuring device can be connected to the high-frequency module inside the mobile station, which device is either integrated with the mobile station, or makes external display of the actual field strength possible. The test mode can again be terminated in block 6 via the base station and/or the mobile station.

We claim:

1. A communication system comprising:
   a base station having a data interface for connection to a data line in a normal mode of operation; and
   a cordless mobile station which communicates with the base station;
   said base station having a detector and a transmitter, said transmitter transmitting a test signal to said cordless mobile station in response to said detector detecting that the data interface is not connected to the data line.

2. The communication system of claim 1, wherein said transmitter transmits said test signal in response to said detector detecting that the data interface is connected to a power supply.

3. The communication system of claim 1, wherein said cordless mobile station includes a receiver which receives said test signal and a field strength detector which measures a field strength of said test signal.

4. A cordless mobile station comprising:
   a receiver which receives a test signal transmitted by a base station in response to a data interface of said base station being connected to a power supply instead of a data line; and
   a field strength detector which measures a field strength of said test signal.

5. A service case for a communication system comprising:
   a base station having a data interface for connection to a data line in a normal mode of operation;
   a cordless mobile station which communicates with the base station;
   said base station having a detector and a transmitter, said transmitter transmitting a test signal to said cordless mobile station in response to said detector detecting that the data interface is connected to a power supply instead of being connected to the data line.

6. The service case of claim 5, wherein said cordless mobile station includes a receiver which receives said test signal and a field strength detector which measures a field strength of said test signal.

* * * * *